United States Patent [19]

Spiegelberg

[11] 4,063,007
[45] Dec. 13, 1977

[54] MOLDED PLASTIC BATTERY CONTAINER

[75] Inventor: Bernard N. Spiegelberg, Milwaukee, Wis.

[73] Assignee: Gould Inc., Rolling Meadows, Ill.

[21] Appl. No.: 721,037

[22] Filed: Sept. 7, 1976

Related U.S. Application Data

[62] Division of Ser. No. 551,295, Feb. 20, 1975, Pat. No. 3,995,008.

[51] Int. Cl.² ............................................. H01M 2/02
[52] U.S. Cl. .................................... 429/176; 220/23.6; 249/105
[58] Field of Search ...................... 429/163, 176, 186; 220/22, 23.6

[56] References Cited

U.S. PATENT DOCUMENTS

| 2,610,760 | 9/1952 | Ball | 220/23.6 |
| 2,896,809 | 7/1959 | Metzger et al. | 220/23.6 |
| 3,561,158 | 2/1971 | Marcan | 220/23.6 |
| 3,767,156 | 10/1973 | Sullivan et al. | 249/107 |

Primary Examiner—Donald L. Walton
Attorney, Agent, or Firm—Leydig, Voit, Osann, Mayer, and Holt, Ltd.

[57] ABSTRACT

A battery container made of molded plastic and preferably formed in a single unitary structure. The container comprises a generally rectangular hollow container with a plurality of internal partitions formed as integral parts of the container bottom and side walls dividing the interior space into a plurality of battery cells. A plurality of ribs are formed on the mold surface that forms the bottom of the container, the ribs being in alignment with the cavities between adjacent mold cores and forming a plurality of parallel grooves in the lower surface of the container bottom. The ribs are at least as wide as the width of the cavities between adjacent cores at the top of the container so that the upper ends of the partitions formed in said cavities fit into the resulting grooves formed by the ribs when the containers are stacked on top of each other. The mold gates are formed in the centers of the ribs, and the feed nozzles extend all the way through the ribs to avoid any reduction in the groove depth due to buildup of plastic at the gates. To maintain a substantially uniform thickness in the bottom of the container in the gate regions, the corners of the mold cores are provided with recesses adjacent the gate regions, thereby increasing the thickness of the lower ends of the partitions in those regions.

2 Claims, 3 Drawing Figures

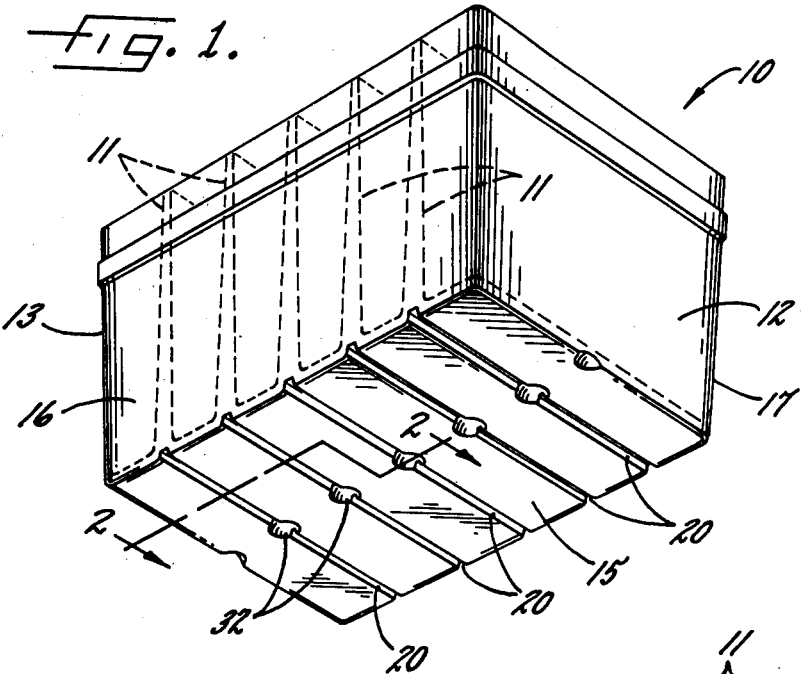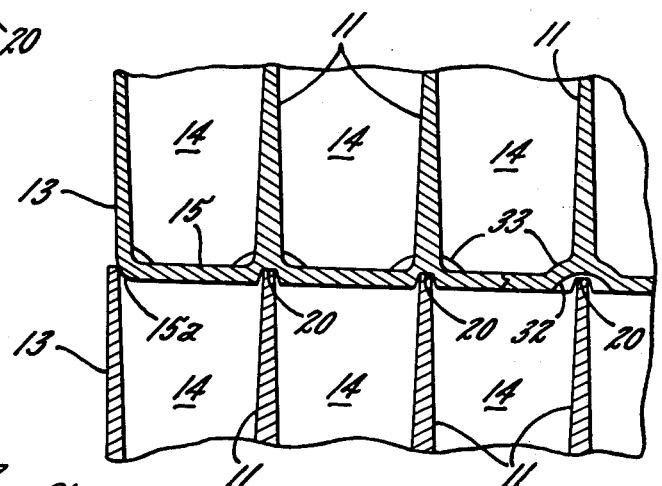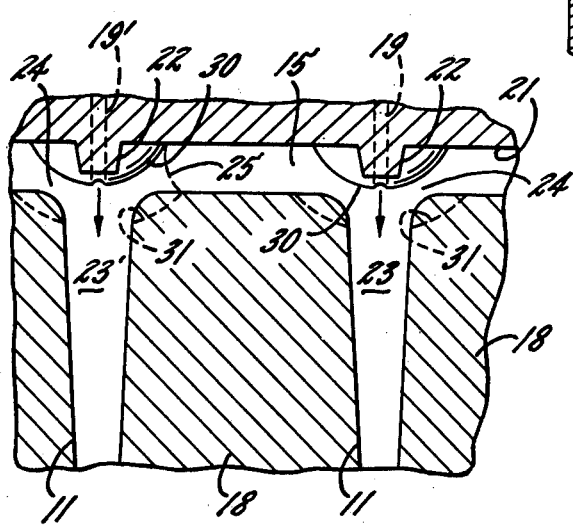

MOLDED PLASTIC BATTERY CONTAINER

This is a division of application Ser. No. 551,295 filed Feb. 20, 1975 now U.S. Pat. No. 3,995,008.

DESCRIPTION OF THE INVENTION

The present invention relates generally to molded plastic battery containers, particularly for automotive batteries, and to methods and apparatus for the molding of such containers.

Battery containers made of molded plastic generally have internal partitions formed as integral parts of the bottom and side walls of the container and extending all the way to the top of the container to prevent the leakage of liquid between adjacent cells. These containers are usually formed as unitary structures in a single molding operation, with a plurality of mold cores defining the internal cavities which form the partitions. The mold is usually gated at the center of the lower end of each partition-forming cavity and the parallel end walls of the container.

One of the problems encountered with containers of this type is that the partitions become distorted or warped during handling and storage, particularly when the containers are stacked on top of each other. Another problem is that defective partitions may be produced due to differences in the feed rates at adjacent gates in the mold used to form the container. These differential feed rates inevitably occur in commercial production, particularly when the temperatures at the various gates are independently controlled by separate electrical heating elements. It is difficult to maintain equal temperatures at all the gates in any given mold, primarily because of the independently controlled heating elements. When the plastic is fed through a pair of adjacent gates at different flow rates, the pressure of the molten plastic increases faster on one side of the corresponding mold cores than on the other side. When the mold cores are supported at only one end, this pressure differential across one of the cores displaces that core toward the lower pressure cavity, thereby making one partition too thin and the adjacent partition too thick. The thinner partitions, of course, are more susceptible to cold shorts and voids or incomplete welds resulting in fluid leakage between adjacent battery cells and consequent failure of the battery.

It is a primary object of the present invention to provide an improved molded plastic battery container which prevents distortion of the internal partitions when the containers are stacked on top of each other.

It is another object of the invention to provide such an improved molded plastic battery container which can be molded with a more uniform thickness in the internal partitions, and a more uniform density of plastic throughout the partitions. In this connection, a related object of the invention is to provide such an improved battery container which greatly reduces the possibility of battery failure due to defective partitions causing fluid leakage between adjacent cells in the battery.

A further object of the invention is to provide an improved method and apparatus for molding plastic battery containers with partitions of uniform thickness. A more specific object is to provide such an improved molding method and apparatus which avoid displacement of the mold cores due to unequal plastic feed rates at adjacent gates in the mold.

Other objects and advantages of the invention will be apparent from the following detailed description and the accompanying drawings, in which:

FIG. 1 is a bottom perspective view of a molded plastic battery container embodying the invention;

FIG. 2 is an enlarged section taken along line 2—2 in FIG. 1; and

FIG. 3 is an enlarged fragmentary section illustrating the molding of a bottom portion of the container shown in FIG. 1.

While the invention will be described in connection with a certain preferred embodiment, it will be understood that it is not intended to limit the invention to that particular embodiment. On the contrary, it is intended to cover all alternatives, modifications, and equivalents as may be included within the spirit and scope of the invention as defined by the appended claims.

Turning now to the drawings and referring first to FIG. 1, there is shown a generally rectangular battery container 10 made of molded plastic. Although the top of the container is closed by application of a lid during assembly of the battery, the container 10 is initially formed with a completely open top. The container includes a plurality of internal partitions 11 extending parallel to the end walls 12 and 13 of the container to form a plurality of battery cells 14. The entire container is molded in one piece, including the partitions 11 which are formed as integral parts of the bottom wall 15 and the side walls 16 and 17 of the container. These partitions 11 extend all the way to the top edge of the container to prevent liquid spillover between adjacent cells 14. As illustrated in FIG. 3, the cells 14 are defined by a plurality of mold cores 18 positioned at equal spaces within the mold shell that forms the external walls 12-13 and 15-17 during the molding operation. The molten plastic is normally introduced into the mold assembly through a plurality of gates 19 aligned with the partition-forming cavities between the mold cores 18 and with the cavities that form the end walls 12 and 13. These gates 19 are shown at the top of the mold assembly in FIG. 3, but this is actually the bottom of the container 10 since it is shown molded in the inverted position.

In accordance with one important aspect of the present invention, the exterior surface of the container bottom forms a plurality of parallel grooves aligned with the internal partitions, the grooves being at least as wide as the upper ends of the partitions so that the partitions of one container nest with the grooves in the bottom of another container when they are stacked on top of each other. Thus, in the illustrative embodiment the bottom wall 15 of the container 10 forms a plurality of grooves 20 aligned with the partitions 11 and extending parallel to the end walls 12 and 13. Each groove 20 is slightly wider than the upper end of one of the partitions 11 so that when two or more containers are stacked on top of one another, as illustrated in FIG. 2, the upper ends of the partitions 11 fit into the grooves 20. Consequently, the partitions 11 are positively held in their original positions, parallel to the end walls 12 and 13, preventing distortion and warpage of the partitions due to the forces that are often exerted thereon during handling and storage.

To permit the partitions 11 to nest with the grooves 20, the lower portion of the container 10 is tapered inwardly so that the bottom of one container nests within the open top of a similar container when stacked thereon. Thus, the end walls 12 and 13 and the side walls 16 and 17 of the container 10 taper inwardly at a slight angle so that the area of the container bottom is slightly smaller than the open area at the top of the container, thereby permitting the bottom of the container to nest within the open top of a similar container as shown in FIG. 2. To further facilitate this nesting of the stacked containers, the periphery of the bottom of the container is also rounded, as at 15a in FIG. 2, so that the external surface of the bottom wall 15 of the container is made even smaller to more readily fit within the open top of a similar container.

In order to form the grooves 20, the mold surface 21 that forms the bottom of the container includes a plurality of ribs 22 in alignment with the partition-forming cavities 23 between adjacent mold cores 18. These ribs 22 form the grooves 20 in the desired location, i.e., in alignment with the bases of the partitions 11 formed within the cavities 23. As can be seen in FIG. 3, the ribs 22 also form a reduced throat 24 between the surface of each rib and the free end of each mold core 18. These reduced throats 24 have been found to be particularly valuable in producing more uniform partitions, apparently by reducing lateral displacement of the mold cores 18 due to differences in the rates at which molten plastic is fed through adjacent gates 19. These differential feed rates inevitably occur in commercial production, particularly when the temperatures at the various gates are independently controlled by separate electrical heating elements. It is difficult to maintain equal temperatures at all the gates in any given mold, primarily because of the independently controlled heating elements.

When the plastic was fed through a pair of adjacent gates at different flow rates in prior molding techniques, the pressure would increase faster on one side of the corresponding mold core than on the other side. Since the mold cores are unsupported at the ends closest to the gates, this pressure differential across one of the cores would displace that core toward the lower pressure side, thereby making the partition on one side of the core too thin and the partition on the other side too thick. The thinner partitions, of course, were also weaker and more susceptible to cold shorts and voids or incomplete welds, resulting in fluid leakage between adjacent battery cells and consequent failure of the battery.

With the improved design provided by this invention, different feed rates tend to automatically vary the mold volumes being fed by the respective gates so that substantially equal pressures are maintained throughout the mold, thereby preventing lateral displacement of the mold cores. For example, if the feed rate at gate 19 in FIG. 3 is greater than the feed rate at the adjacent gate 19, the plastic entering the mold from the higher flow rate gate 19 will produce a "wave front" closer to the lower feed rate gate 19' than the gate 19, as indicated at 25 in FIG. 3. As a result, a greater percentage of the plastic entering through the gate 19' feeds into the cavity 23', while a greater percentage of the plastic entering through the gate 19 feeds into the cavities which form the bottom wall 15 of the container. Consequently, a substantially equal pressure of molten plastic is maintained on both sides of the mold core 18, in spite of the differential feed rates through the two adjacent gates 19 and 19'.

In accordance with another aspect of this invention, the feed nozzles at the mold gates 19 extend into the mold beyond the innermost surfaces of the ribs 22 to ensure against any reduction in the groove depths due to plastic buildup at the gate locations. Thus, in the illustrative embodiment the feed nozzles 30 extend completely through the ribs 22 so that even if there is a slight buildup of plastic at the end of the gate, the surface of this plastic buildup will still be below the level of the groove in which that gate is located. To avoid any restriction in the throats 24 between the ribs 22 and the mold cores 18 in the gate areas occupied by the nozzles 30, the adjacent corners of the mold cores are provided with recesses 31 complementary to the shape of the nozzle tips so that the space between the nozzle 30 and the recesses 31 has substantially the same width as the space between the ribs 22 and the corners of the mold cores 18. Consequently, there is even distribution of plastic across the entire width of the container, including the areas immediately adjacent the various gates 19. In the final product, the result is a depression 32 in the exterior surface of the bottom wall 15 at each gate location, and an increase in the thickness of the adjacent portions 33 of the bases of the partitions 11 (FIG. 2).

As can be seen from the foregoing detailed description, this invention provides an improved battery container which prevents distortion of the internal partitions when the containers are stacked on top of each other, due to the nesting of the grooved bottom surfaces of the upper containers with the top ends of the partitions and end walls of the lower partitions. Furthermore, the same ribs which form the bottom grooves also improve the flow characteristics of molten plastic within the mold during the molding operation, producing partitions with a more uniform thickness and density. The reduced throats formed between the ribs and the adjacent mold cores apparently reduce displacement of the mold cores due to different feed rates at adjacent gates in the mold wall which forms the bottom of the container. Consequently, the resulting battery container greatly reduces the possibility of battery failure due to defective partitions due to cold shorts and voids or incomplete welds resulting in fluid leakage between adjacent battery cells. Another major effect of the ribbed bottoms is a reduction of the incidence of partition warpage, which condition precipitates problems in subsequent manufacturing operations, notably the inability to effect a good cover seal along the line of a warped partition, resulting in leakage potential from adjacent cells.

I claim as my invention:

1. A molded plastic battery container comprising
   a generally rectangular hollow container with a closed bottom and open top,
   a plurality of vertical partitions formed as integral parts of the container bottom and side walls and extending upwardly to the top of the container to divide the container into separate cells,
   the external surface of the container bottom forming a plurality of grooves aligned with said partitions, the width of the grooves being at least as wide as the thickness of the top ends of the partitions so that multiple containers nest together when stacked on top of each other with the top ends of the partitions of one container fitting into the bottom grooves of another container, a depression formed in the center of each groove due to the seating of feed nozzles therein during the molding of the container, the depression being at least as deep as the groove and the thicknesses of said said partition being increased in the regions of said depression at the lower ends thereof to provide a substantially uniform bottom wall thickness.

2. A molded plastic battery container comprising a generally rectangular hollow container with a closed bottom and open top, a plurality of vertical partitions formed as integral parts of the container bottom and side walls and extending upwardly to the top of the container to divide the container into separate cells, the external surface of the container bottom forming a plurality of grooves aligned with said partitions, the width of the grooves being at least as wide as the thickness of the top ends of the partitions so that multiple containers nest together when stacked on top of each other with the top ends of the partitions of one container fitting into the bottom grooves of another container, the container wall between the tops of said grooves and the bottoms of said cells being thinner than the adjacent portions of said partitions and the remainder of the bottom wall of the container.

* * * * *